(12) United States Patent
Jurgilewicz et al.

(10) Patent No.: US 8,627,132 B2
(45) Date of Patent: Jan. 7, 2014

(54) AUTONOMOUS MULTI-DEVICE EVENT SYNCHRONIZATION AND SEQUENCING TECHNIQUE ELIMINATING MASTER AND SLAVE ASSIGNMENTS

(75) Inventors: Robert P. Jurgilewicz, Pepperell, MA (US); Roger Aaron Zemke, Derry, NH (US)

(73) Assignee: Linear Technology Corporation, Milpitas, CA (US)

( * ) Notice: Subject to any disclaimer, the term of this patent is extended or adjusted under 35 U.S.C. 154(b) by 1050 days.

(21) Appl. No.: 12/645,258

(22) Filed: Dec. 22, 2009

(65) Prior Publication Data

US 2010/0169695 A1 Jul. 1, 2010

Related U.S. Application Data

(60) Provisional application No. 61/141,777, filed on Dec. 31, 2008.

(51) Int. Cl.
*G06F 1/12* (2006.01)

(52) U.S. Cl.
USPC .......................................... 713/400; 718/102

(58) Field of Classification Search
USPC ............................ 713/400, 501, 502; 718/102
See application file for complete search history.

(56) References Cited

U.S. PATENT DOCUMENTS

| | | |
|---|---|---|
| 5,798,969 A | 8/1998 | Yoo et al. |
| 6,247,644 B1 | 6/2001 | Horne et al. |
| 2003/0172179 A1 | 9/2003 | Del Prado Pavon et al. |
| 2004/0140919 A1 | 7/2004 | Schafferer |
| 2009/0182608 A1* | 7/2009 | Tran et al. .......................... 705/9 |

FOREIGN PATENT DOCUMENTS

EP 0137609 A2 4/1985

OTHER PUBLICATIONS

International Search Report and Written Opinion of the International Searching Authority issued in International Patent Application No. PCT/US2009/069922, mailed Mar. 9, 2010.
Extended Europan Search Report issued in Application No. 09837200.6-1959 dated Jul. 25, 2013.

* cited by examiner

*Primary Examiner* — Glenn A Auve

(57) ABSTRACT

An apparatus and method for event synchronization. One or more devices that have a plurality of events to be carried out in a scheduled order in time are connected to a single shared time position clock (TPCLK). There are one or more sequencing controllers coupled with the one or more devices and configured to control the timing of high and low states of the shared TPCLK in accordance with the scheduled order. The synchronization among the plurality of events in the scheduled order is achieved based on the high and low states of the shared TPCLK and such synchronization of the plurality of events in the scheduled order is operated without the presence of master and slave devices.

34 Claims, 10 Drawing Sheets

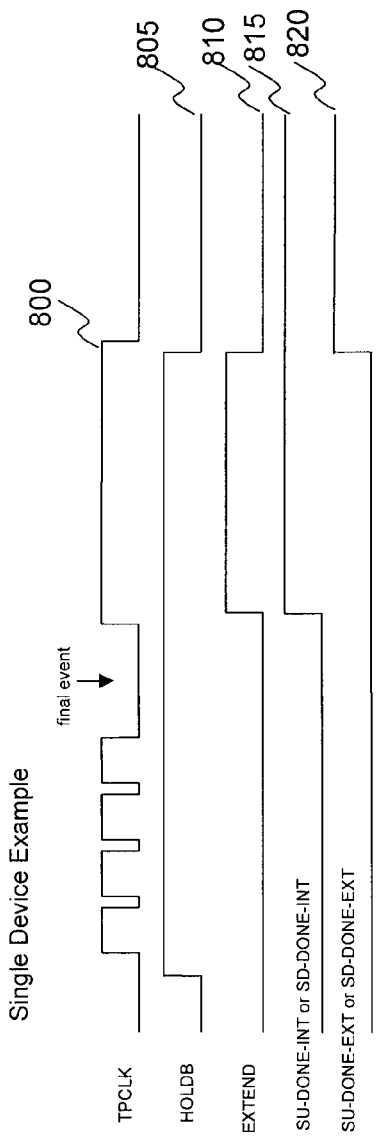
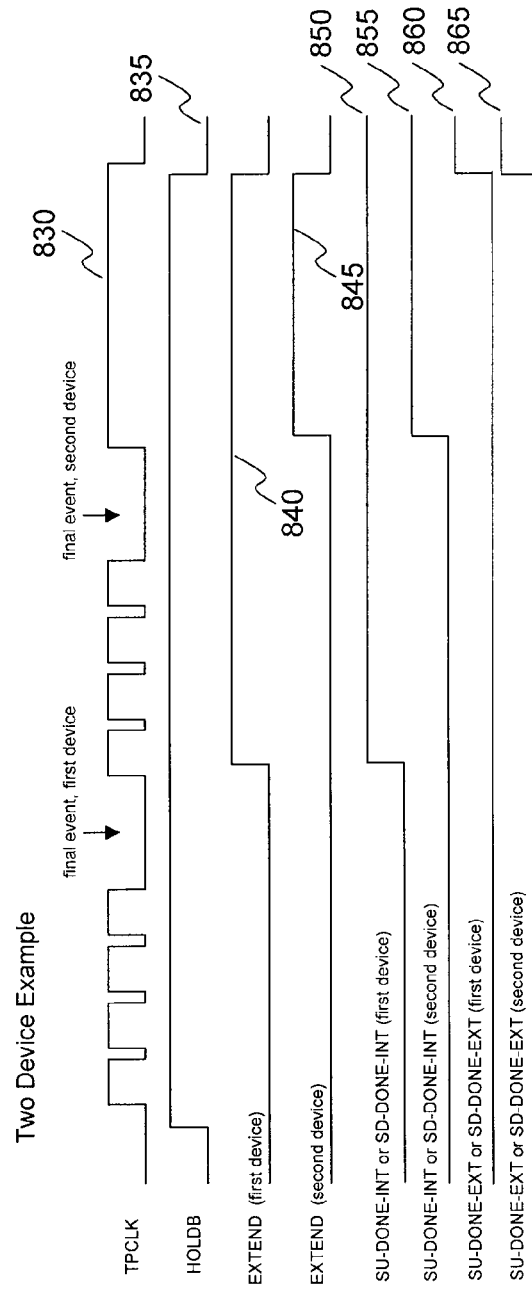

AUTONOMOUS MULTI-DEVICE EVENT SYNCHRONIZATION AND SEQUENCING TECHNIQUE ELIMINATING MASTER AND SLAVE ASSIGNMENTS

RELATED

The present invention claims priority of provisional patent application No. 61/141,777 filed Dec. 31, 2008, the contents of which are incorporated herein in their entirety

BACKGROUND

1. Technical Field

The present teaching relates to method and system for event synchronization. More specifically, the present teaching relates to method and system for event synchronization without designating master and slave devices and the systems incorporating the same.

2. Discussion of Technical Background

Many electronic systems require multiple power supplies to achieve the functionality they are designed for. Frequently, such power supplies have to be turned on and off in a specific order with specific time relationships (sequencing) in order to prevent damage to the powered devices. Sometimes the sequencing even involves multiple electronic circuits located in physically different locations or sub-assemblies. Given that, it is commonly understood that to perform sequencing amongst multiple devices, a means of electrical communication between electronic circuits to be sequenced has to occur in a proper manner. Therefore, it is desirable to synchronize multiple events among multiple devices in a cost effective way.

Traditionally, approaches developed for a sequencing system include a master device and at least one slave device. The master and slave device(s) are responsive to a single sequencing signal. The master device controls the timing among sequenced events. The duration of the sequenced event is controlled by master or slave devices responsive to an event complete signal. A counter residing in each device keeps track of each sequence position. Often, enable or disable signals may be generated for the sequenced event at any sequence position. Multiple sequenced events may occur at any sequence position. It is the master device that controls the termination of the sequencing operation and typically it is done by controlling when the maximum number of events allowed by the sequence position counter has been realized.

Although such prior methods also use a single node, they require master device and slave device designations. Such designations of master and slave properties imply that additional circuits must exist, which implement the master and slave functions. The additional circuits add complexity and consume physical resources. In addition, the prior methods also require a rigid number of potential sequencing positions, i.e., the sequencing operation must go through a fixed number of positions even when some of the positions do not correspond to any scheduled events. For example, in a system using the prior art solutions, if there are N available sequence positions, the single wire communication will toggle into N states during the turn-on phase and N states during the turn-off phase, regardless of whether or not all N states are required. That is, if the last few positions do not really have any event scheduled, rather than completing the sequencing operation when there are no more events, the prior solutions must cycle through all positions before ending the operation. This introduces another waste of resources and leads to a latency between the last sequenced event and "steady-state" operation. Therefore, a more cost effective and self-organizing sequencing system is needed.

BRIEF DESCRIPTION OF THE DRAWINGS

The inventions claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 2($b$) shows a timing diagram of an exemplary sequencing down operation, according to an embodiment of the present teaching;

FIG. 4($b$) depicts an exemplary implementation of a TPCLK control unit, according to an embodiment of the present teaching;

FIG. 8($a$) shows the timing diagram involved in a one-device self-termination process, according to an embodiment of the present teaching; and FIG. 8($b$) shows the timing diagram involved in a two-device self-termination process, according to an embodiment of the present teaching.

DETAILED DESCRIPTION

The present teaching discloses a sequencing control method for event synchronization among a plurality of devices. Specifically, the present teaching describes a sequencing method and system that uses only one node or a single wire without traditional master device and slave device designations. The disclosed method and system also provides a sequencing approach that is self-actuating and self-terminating as soon as all turn-on or turn-off events have been achieved, eliminating the need for "start" and/or "stop" signals. This allows a control of enable/disable event signals in an arbitrary number of sequence positions.

The present disclosure offers a novel single wire sequencing system and protocol. The single wire (or node) is connected to all devices requiring event synchronization. The electrical activity on the single wire resembles that of an electronic clock. Thus, for ease of discussion, the electrical activity on the single wire is referred as "Time Position Clock" or TPCLK in the following description. In the illustrated embodiments, instances where the TPCLK signal is low define an indexed time position. In addition, falling edges of the TPCLK define starting points for events, and rising edges of the TPCLK define the completion of events. As a person skilled in the art would understand, such definition is merely for illustration rather than limitation.

The sequencing operation as described herein provides for self-actuation of sequencing events upon the application of device power. Although power may be applied to all devices simultaneously, different devices may require different time periods to configure and stabilize. The present teaching discloses the means to hold a single communication node in a fixed state until all devices are ready to participate in a sequencing process.

Due to the self-terminating capability of the present teaching, when there are events scheduled at only M sequence positions out of all N available time positions, where N>M, the sequencing approach as disclosed herein is able to self-terminate after M events (without having to cycle through all N time positions). This eliminates any potential latency between the completion of turn-on or turn-off events and the termination of the single wire communication (such latency exists in the prior art solutions). With such latency being removed, the transition from the end of all turn-on or turn-off events to steady-state operation is immediate.

Due to a single wire solution without a master and slave configuration, no additional circuit is required to fulfill master/slave functionalities, which reduces the complexity and thus requires less physical area to implement event synchronization without sacrificing quality.

Figure 1:
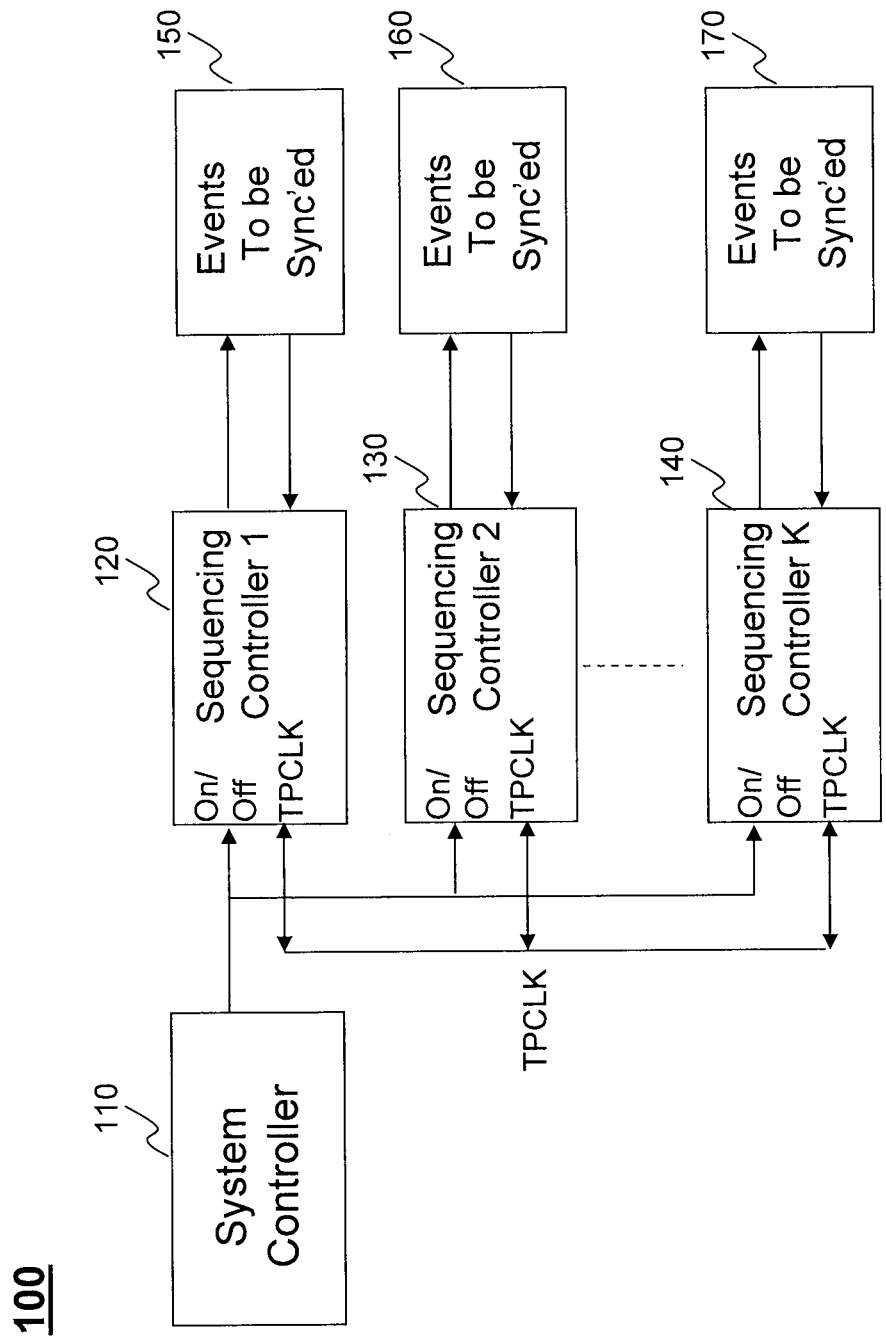
FIG. 1 depicts an exemplary high level system block diagram for event synchronization among different devices, according to an embodiment of the present teaching.

FIG. 1 depicts an exemplary high level system block diagram 100 for event synchronization among different devices, according to an embodiment of the present teaching. System 100 comprises a system controller 110, a plurality of sets of scheduled events to be synchronized 150, 160, . . . , 170 which are to be synchronized via the present teaching described herein, and a plurality of sequencing controllers 120, 130, . . . , 140, which control the sequencing operation among all events scheduled to be synchronized. Exemplary scheduled events include power supply turn-on and turn-off. In this case, the sequencing control from the sequencing controllers pertains to the orderly turn-on and turn-off of the power supplies. In the following discussions, power supplies are used in describing the present teaching. However, it is understood that, although disclosed in the context of a power supply, the sequencing method described herein is not limited to power supplies and may be applied to any application requiring sequencing control.

The system controller 110 controls the on and off state of the system 100. Such control signal (On/Off) is sent to the plurality of sequencing controllers to control the on and off state of the system. Another signal connecting all sequencing controllers is the time position clock or TPCLK, which serves as both input and output of the sequencing controllers.

When system 100 is initially powered on, all devices connected to TPCLK pull a TPCLK signal low. After the respective power-on-reset phases of the devices are completed, TPCLK is allowed to be pulled high for a preset time. Internally, all devices connecting to TPCLK sense the high condition under which TPCLK is allowed to be pulled low to define the first time position. In some embodiments, the first device that senses the high condition is the first device that initiates to pull TPCLK down to mark the first time position. Generally, such marked first position starts the sequencing operation.

In a sequencing operation, devices that have sequencing events scheduled at the first time position pull TPCLK low for a minimum amount of time. Such a minimum amount of time can be configured in the system. In the meantime, devices that have sequencing events scheduled for some later time positions also pull TPCLK low for the same minimum amount of time. At each time position, TPCLK is held low until each device that has event(s) scheduled at that time position completes the scheduled event(s). The event that requires the longest amount of time to complete stretches the TPCLK low time accordingly. Thus, if none of the devices connecting to TPCLK has a sequencing event scheduled for a particular time position, TPCLK is pulled low only for the minimum amount of time. In this case, when TPCLK is released by all devices after the minimum amount of time, TPCLK is pulled high again and the process repeats.

In accordance with the TPCLK protocol, as described herein, when a device has completed its sequencing events, the device will release TPCLK, i.e., it no longer pulls TPCLK down. That is, when all devices have completed their sequencing events, TPCLK is no longer pulled down. The sequencing controllers 120, 130, . . . , 140 can sense the condition in which TPCLK has an unusually long pull-up state. When this occurs, TPCLK is reset and waits for the next sequencing process.

Figure 2A:
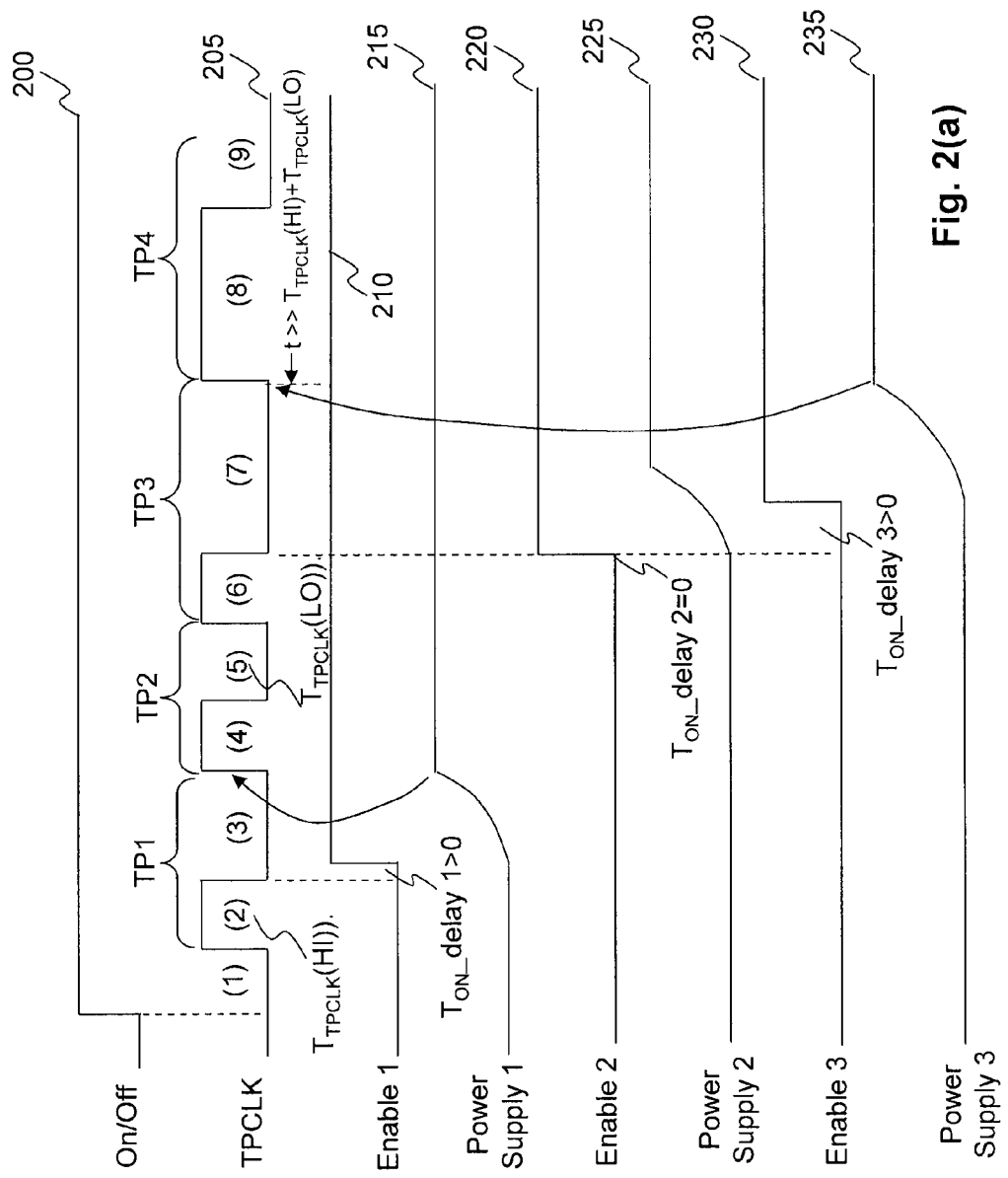
FIG. 2($a$) shows a timing diagram of an exemplary sequencing up operation, according to an embodiment of the present teaching.

FIG. 2(a) shows a timing diagram of an exemplary sequencing up operation, according to an embodiment of the present teaching. Although this timing diagram is shown with control of power supplies to three devices, the present teaching is not limited to a particular number of devices and can be expanded to any number of power supplies. In addition, as discussed herein, although the illustration is shown with certain signal polarities, a working example with inverted signal polarities can be similarly devised.

In the illustration shown in FIG. 2(a), there is a plurality of signals presented along a time line. For instance, the on/off signal 200, TPCLK signal 205, enable the signal for the first/second/third devices 210, 220, and 230, respectively, and power supply signals to the first/second/third devices 215, 225, and 235, respectively. The discussion is presented in an order of different time periods marked along TPCLK signal, e.g., (1), (2), . . . , (9). Below, signal states at each of such marked time periods are discussed.

At time period (1), the system including all three connected sequence controllers is powered on simultaneously. After the power on, TPCLK signal 205 is pulled low. This is so called power-on-reset (POR) period, which is set long enough such that all sequencing controllers are configured and operating in a logically stable manner. In some embodiments, the optional On/Off signal 200 is implemented. When the On/Off signal 200 is in the ON state and all connected sequencing controllers have completed their POR, TPCLK signal 205 is released, i.e., it is no longer pulled down or it is pulled up. In implementation, the pull up operation can be achieved based on an internal current source or resistors, which will be discussed with reference to FIG. 3. Once TPCLK is pulled high, the connected sequencing controllers connected thereto sense the condition and start to clock themselves, e.g., on the rising edge of TPCLK, and proceed to Time Position 1 (TP1). In some embodiments, the On/Off signal 200 may not be implemented. It is noted that even if the ON/OFF signal is not present, the sequence-up process is self-starting.

At time period (2), TPCLK remains high for a short period ($T_{TPCLK(HI)}$). The high period is set long enough so that the sequencing controllers all have enough time to sense the pulled up condition on TPCLK.

At time period (3), sequencing controllers that are scheduled to enable power supplies at time position 1 or TP1 pull TPCLK low. At the same time, those sequencing controllers that are scheduled to enable power supplies at a future time position also pull TPCLK low but only for a short period, e.g., $T_{TPCLK(LO)}$, corresponding to the minimum pull down time. Generally, $T_{TPCLK(LO)}$ is set long enough so that all sequencing controllers have enough time to sense the pulled down condition. In some embodiments, the start of power supply scheduled for enable can be delayed by a programmable period of time, e.g., equal to $T_{ON\_DELAY}$ after TPCLK is pulled low. As shown, the first power supply enable signal Enable 1 210 occurs a short time ($T_{ON\_DELAY1}$>0) after TPCLK is pulled low.

Once a supply is enabled, the power supply starts to ramp up. It usually takes some time for power to ramp up to a threshold at which it is considered a successful power supply ramp up. This is shown in FIG. 2(a) where power supply 1 ramps up to a certain level within a period of time. To ensure that a power supply successfully ramps up to an acceptable level, an internal power-good timer (counter) may be deployed. This may correspond to a test by which an enabled power supply has to reach a programmable voltage threshold before the power-good counter exceeds a programmable time limit for the respective supply. If for any reason, an enabled power supply fails the power-good test, a fault is issued. In this case, to ensure proper sequencing, all sequenced supplies may be shut down as a reaction to the failure. That is, with this control scheme, power supplies scheduled to enable in some future time positions cannot be enabled if a previous power-good test fails. This prevents applying voltage bias with incorrect order to sensitive loads.

In addition, when there are multiple power supplies enabled in the same time position with sufficient turn-on delays in between, applying reasonable amounts of power-good time can be used as a mechanism to shut down a power supply prior to load malfunction, if the supply magnitudes are not reaching a required level within the programmable times. Note that all sequenced supplies may have their own respective programmable time positions, turn-on delays, and power-good watchdog times. When needed, TPCLK low time can be stretched by turn-on delays and the inherent power supply ramp up time(s). This automatic stretching prevents future events from occurring before past events have been qualified.

When all power supply enable signals at the same time position, e.g., Enable 1 in TP1, within each sequencing controller have been qualified, TPCLK is released by such sequencing controllers. For example, in FIG. 2(a), when power supply 1 passes the power-good time test, it releases TPCLK, i.e., allowing TPCLK to be pulled high, which could be done through an internal current source in the sequencing controller. When this occurs, all sequencing controllers are clocked by the rising edge of TPCLK to time position 2 or TP2.

At time period (4), TPCLK remains high for a short period ($T_{TPCLK(HI)}$). Similarly, the length of time to remain high may be designed so that it is an adequate amount of time for sequencing controllers to sense the high condition. After this high period, TPCLK goes down. At the falling edge of TPCLK (in time period (5)), subsequent scheduled power supplies may be sequenced. In this illustrated example, there is no power supply scheduled for TP2. However, as discussed herein, all sequencing controllers that have future scheduled enablement of power supplies will pull TPCLK low at the falling edge of TPCLK for a programmed minimum amount of time ($T_{TPCLK(LO)}$). After this period, TPCLK is then released and pulled high. At this point, all sequencing controllers are clocked by the rising edge of TPCLK to time position 3 or TP3.

In time position TP3 (time periods (6) and (7)), sequencing controllers that are scheduled to enable power supplies at TP3 pull TPCLK low. In addition, sequencing controllers that are scheduled to enable power supplies at a future time position (after TP3) also pull TPCLK low but only for a short period, e.g., $T_{TPCLK(LO)}$, corresponding to the minimum pull down time. In this particular example in FIG. 2(a), sequencing controller 2 and 3 have scheduled enablement of power supplies in TP3. Specifically, signal Enable 2 of sequencing controller 2 does not have any delay, i.e., $T_{ON-Delay2}$=0, and signal Enable 3 of sequencing controller 3 does have a non-zero delay, i.e., $T_{ON-Delay3}$>0. Similarly, once enabled, the corresponding power supplies (2 and 3) may take some time to ramp up to the level that meet certain threshold requirements. When both power supplies (2 and 3) meet the power-good time requirement, they release TPCLK at (8), i.e., allowing TPCLK to be pulled high.

In this example, after power supply 3 is successfully sequenced, there are no more supplies scheduled for enable within any sequencing controller. In this case, TPCLK remains high. If such a high condition lasts for a period t>>($T_{TPCLK(HI)}$+$T_{TPCLK(LO)}$), which can be sensed by all sequencing controllers, it will be considered by all sequencing controllers that the sequence up process is complete. Through this means, a self-terminating scheme can be achieved. In addition, based on this self-terminating scheme, there is no need to have sequencing controllers go through a fixed number of TPCLK transitions.

At time period (9), all sequencing controllers pull down TPCLK after sensing that self-termination should start when t>>($T_{TPCLK(HI)}$+$T_{TPCLK(LO)}$) is satisfied. When this happens, each sequencing controller may perform some house-keeping operations, e.g., generating a signal indicating that the sequence process is complete or resetting counters to zero.

During the above described sequence up process, if the On/Off signal is at the Off state before the sequence up process is completed, then a controller fault may be issued. In this case, to prevent malfunction, all enabled power supplies may be disabled.

Figure 2B:
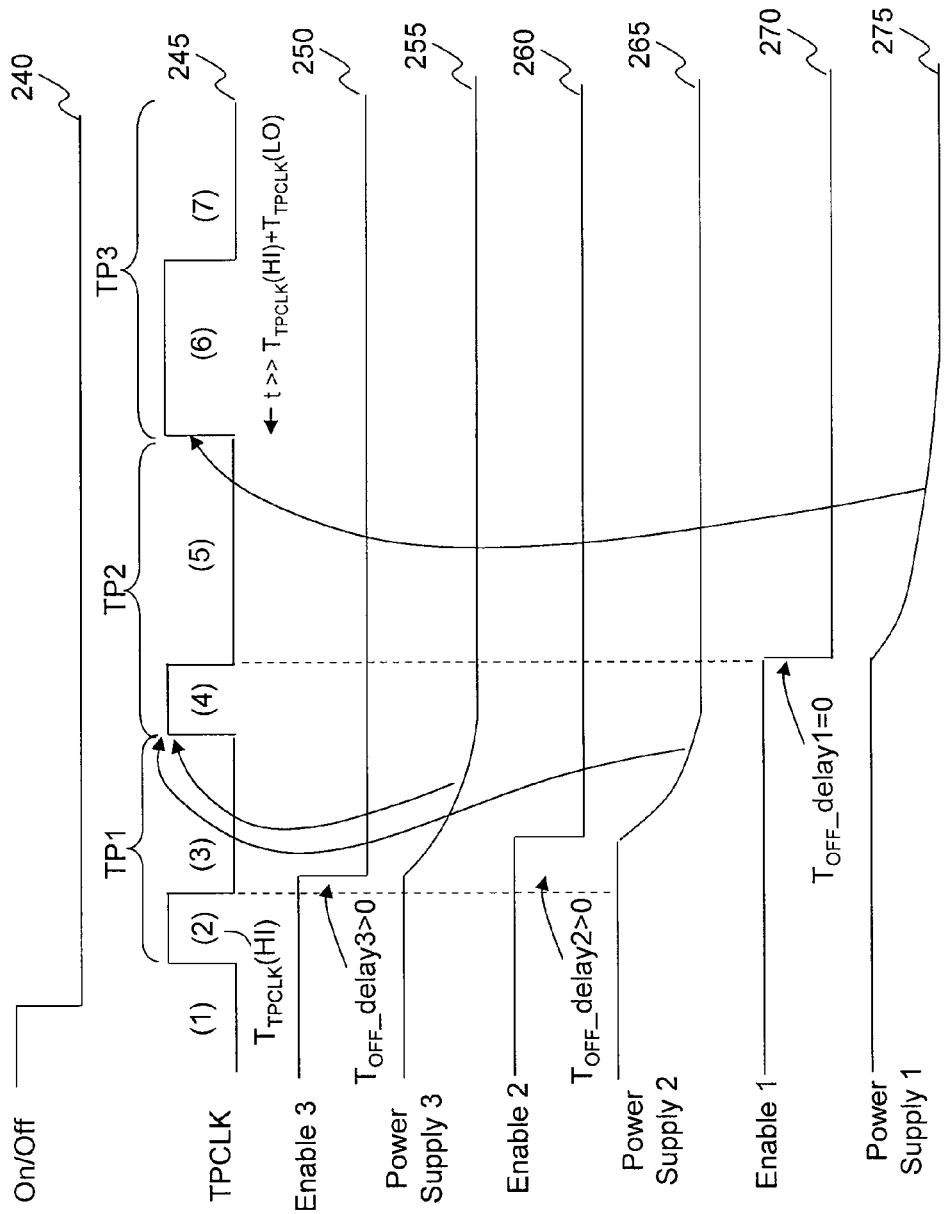

FIG. 2(b) shows a timing diagram showing a general sequence of turning-off events for three power supplies, according to an embodiment of the present teaching. In this figure, similar signals are shown and TPCLK is divided into three exemplary time positions, TP1, TP2, and TP3. Sequencing controllers initiate a sequence down process when the On/Off signal 240 is pulled down to the Off state at time period (1) in FIG. 2(b). In some situations, the sequence order of power supplies to different devices may be the reverse order of how they are powered up. But it does not have to be the case. In general, in a sequencing down process, the order the devices are disabled may be programmed in an order that is reasonable to the particular underlying system.

At time period (2), since the On/Off signal is at the Off state, TPCLK is released by all sequencing controllers and pulled high and all sequencing controllers are clocked to time position 1 or TP1 of the sequencing down process. Similar to the sequencing up process, TPCLK remains high for a short period ($T_{TPCLK(HI)}$). The high period is set long enough so that all sequencing controllers have enough time to sense the pulled up condition.

At time period (3), sequencing controllers that have power supplies scheduled for disable in TP1 pull TPCLK low. At the same time, those sequencing controllers that have power supplies scheduled for disable at a later time position also pull TPCLK low for a short period ($T_{TPCLK(LO)}$, which is set long enough to provide an adequate length of time for all sequencing controllers to sense the pull down condition. As can be seen in FIG. 2(b), sequencing controller 3 first sequences down followed by sequencing controllers 2 and 1.

During sequencing down, sequencing controller 3 pulls TPCLK low after a programmable turn-off delay ($T_{OFF\_DELAY3}$) and then disables power supply 3. As illustrated, the actual ramping down of power supply 3 takes some time and disabled power supplies are monitored and are required to fall below a programmed discharge threshold. Similar to the power-good test, for sequencing down, a corresponding test may be employed to ensure that a ramping down power supply reaches a satisfactory level.

In this illustrated example, sequencing controller 2 is also scheduled to disable its power supply during TP1 but it has a longer delay ($T_{OFF\_DELAY2}$) than that of sequencing controller 3 ($T_{OFF\_DELAY3}$). Both disabled power supplies are monitored and are required to fall below a programmable discharge threshold. Once the discharge threshold is met, TPCLK is released and pulled high and all sequencing controllers are clocked to time position 2 or TP2.

Once pulled high, TPCLK remains high for a short period ($T_{TPCLK(HI)}$) during time period (4). During this period, sequencing controller 1 which is scheduled for disable in TP2 senses the high state of TPCLK and pulls it down to low with a zero delay, i.e., $T_{OFF\_DELAY1}=0$. After power supply 1 is discharged to a programmable discharge threshold, TPCLK is again released at the end of TP2. Then all sequencing controllers are clocked to time position 3 or TP3.

In time period (6), TPCLK remains high. Since there are no more power supplies scheduled for turn-off, TPCLK is kept high for a period $t \gg (T_{TPCLK}(HI)+T_{TPCLK}(LO))$. When this extended period of high state is sensed by all sequencing controllers, the sequence down process is considered complete. So, again, the sequencing down process is also self-terminating. Similarly, due to the fact that the sequencing down process is self-terminating, there is no need for the sequencing controllers to go through a fixed number of TPCLK transitions as is done in the prior art.

After an extended period of high state and it is determined that the sequencing down process is complete, all sequencing controllers pull down TPCLK at (7). Similar to the sequencing up process, if, during the sequence down process, the On/Off signal is pulled to the On state before sequencing down is complete, then a sequencing controller fault may be generated to indicate the faulty situation. If the On/Off signal is in the Off state and sequencing down is complete, another new sequencing process can be started by pulling the On/Off signal to the On state.

As can be seen in FIGS. 2(a) and 2(b), the time position clock TPCLK provides indexed clock edges that are used to trigger sequential enable/disable control signals. Such control signals are used in a multiple power supply system controlling an ordered sequence of power-on or power-off events. In the following, the description is directed at how TPCLK is generated and how it operates when no event requests are present. In some embodiments, TPCLK can be activated automatically with the application of device power. In some embodiments, TPCLK can also be activated by an external logic stimulus.

Figure 3:
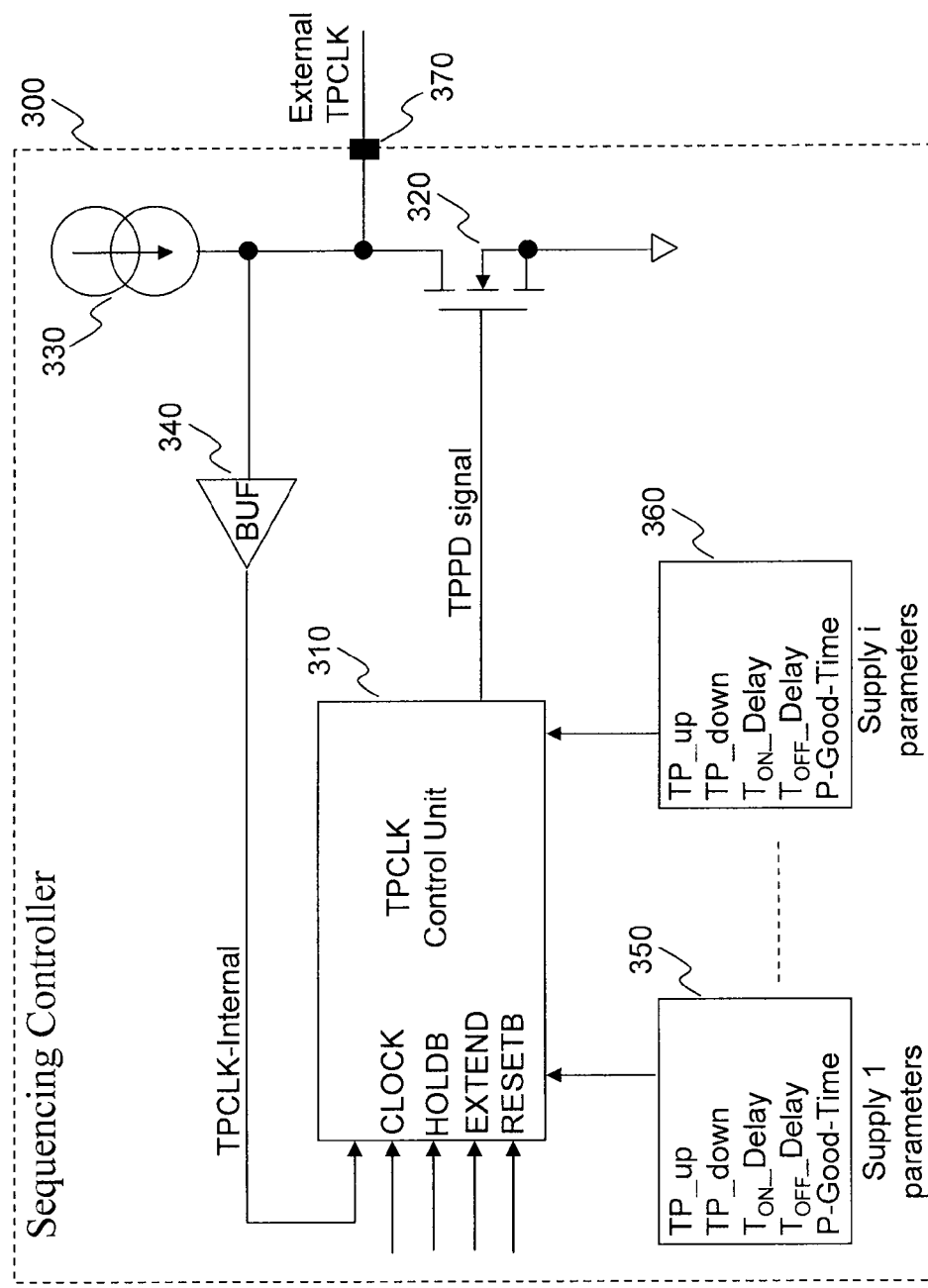
FIG. 3 depicts an exemplary implementation of a sequencing controller, according to an embodiment of the present teaching.

FIG. 3 depicts an exemplary implementation of a sequencing controller 300, according to an embodiment of the present teaching. Sequencing controller 300 comprises a TPCLK control unit 310, a switch 320, a current source 330, and a buffer 340. The switch 320 and the current source 330 are connected in series. The output of the switch is connected, via a pin 370, to an external TPCLK which is also connected to other devices requiring event synchronization. The external TPCLK is also fed back to the TPCLK control unit, as an internal TPCLK via buffer 340. Other inputs to the TPCLK control unit 310 include a clock signal CLOCK, a HOLDB signal, an EXTEND signal, and a RESETB signal.

Among inputs to TPCLK control unit 310, RESETB is used to initialize the TPCLK control unit after initial power is applied or after a fault condition is cleared. The CLOCK signal is used to advance the internal states of the TPCLK control unit 310. The HOLDB signal is used to prevent the TPCLK function from operating by holding the TPCLK output at a logic low. Signal EXTEND is used to prolong or extend a TPCLK logic high for a period longer than usual (to be discussed later), indicating that all internally scheduled sequencing functions have completed.

Signal CLOCK is preferably a clock common to all the multiple devices that share TPCLK. In some embodiments, the CLOCK signal is derived from a clock generator deployed to provide a common time-base across multiple devices. In a multiple sequencer device application, it may be desirable to operate the TPCLK function with a phase-locked common time-base. Independent clocks similar in frequency (+/−10%) but with unrelated phase may also be applied.

Based on its inputs, the TPCLK control unit 310 produces a time position pull down or TPPD signal, which is used to control the state of TPCLK. Specifically, TPPD signal drives the gate of switch 320. When the TPPD signal is logic high, switch 320 becomes conductive and pulls TPCLK to ground. When TPPD is logic low, switch 320 becomes non-conductive and TPCLK is pulled up by the current source 330. In some embodiments, the current source may be replaced by other suitable devices such as a resistor to achieve the same function.

Buffer 340 functions as a receiver, passing the external TPCLK signal to the TPCLK control unit 310. Due to the fact that external devices or other delays may exist affecting the TPCLK output, the received external TPCLK may be asynchronous with the internal clock (CLOCK). To synchronize, the TPCLK control unit 310 may provide an appropriate circuit capable of synchronizing such signals in order to prevent meta-stable operation. This will be discussed below with reference to FIGS. 4 and 5.

To operate, the sequencing controller 300 also comprises a set of stored power supply parameters 350. This includes time position up (TP_up), time position down (TP_down), on-delay ($T_{ON}\_Delay$), off delay ($T_{OFF}\_Delay$), or power good time (P-Good-Time). Such parameters may be stored in the sequencing controller 300 and can be accessed in operation. In some embodiments, such stored parameters may be re-configured to meet application needs. In some embodiments, the sequencing controller 300 may be designed to be able to control TPCLK based on a plurality sets of parameters such as 350, ..., 360. In this case, a single sequencing controller is capable of acting on behalf of several devices requiring event synchronization.

Figure 4A:
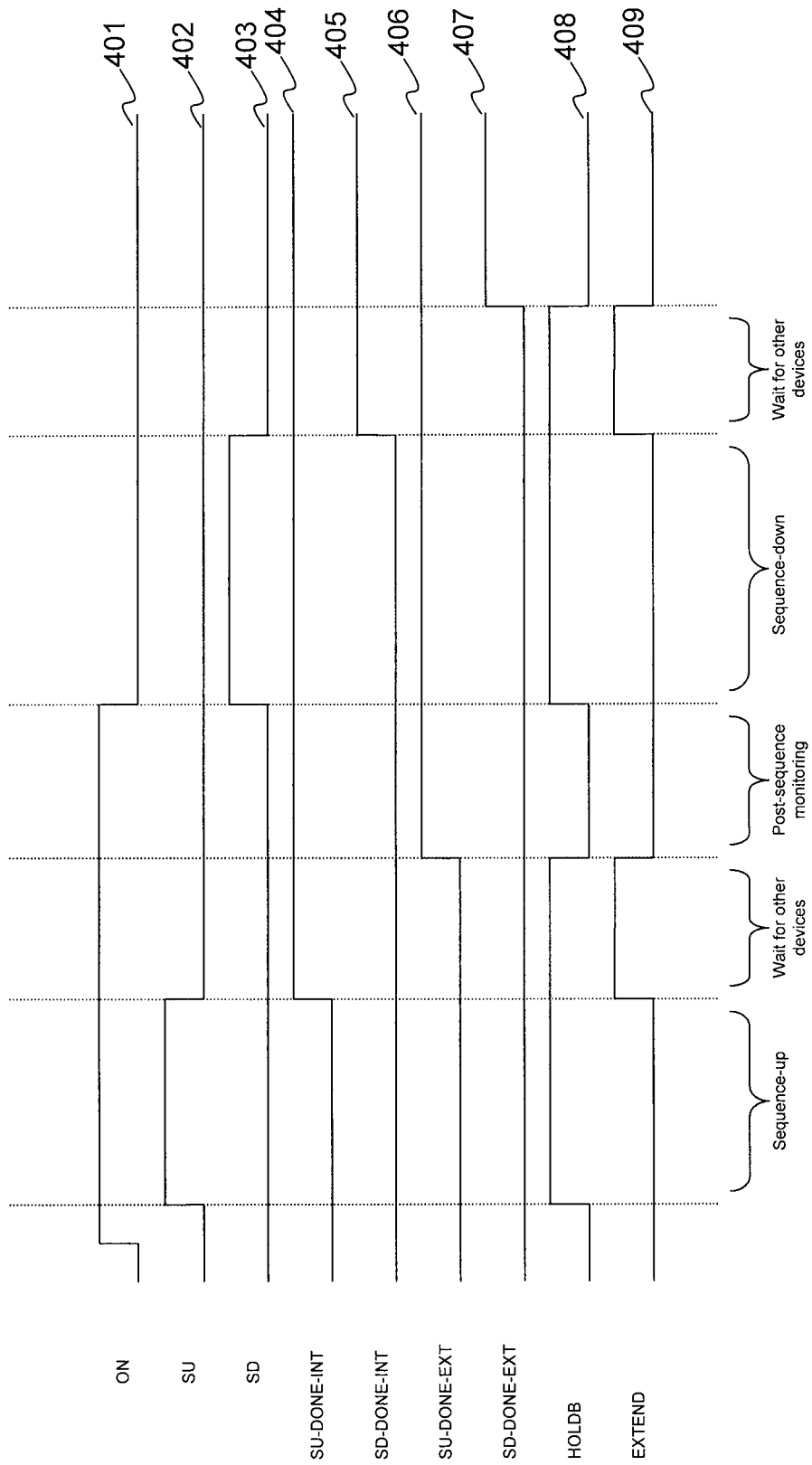
FIG. 4($a$) illustrates timing diagram showing a relationship among different signals, according to an embodiment of the present teaching.

Various signals serve as inputs to the TPCLK control unit. FIG. 4(a) provides an exemplary timing diagram showing the relationship in time among some of the input signals, TPCLK, and other signals indicating the status of events, according to an embodiment of the present teaching. In FIG. 4(a), a total of nine signals are shown, including On signal 401, sequencing up (SU) signal 402, sequencing down (SD) signal 403, sequencing up done internal (SU-DONE-INT) signal 404, sequencing down done internal (SD-DONE-INT) signal 405, sequencing up done external (SU-DONE-EXT) signal 406, sequencing down done external (SD-DONE-EXT) signal 407, HOLDB signal 408, and EXTEND signal 409. As can be seen, when the On signal becomes high, it represents a period in which events scheduled can be carried out (in this example, they are power supply sequencing up and sequencing down).

After a short delay, the sequencing up signal SU goes high representing a time region in which a sequencing up operation is taking place. The HOLDB signal goes up at the same time as the SU signal that makes TPCLK be pulled low. When the sequencing up operation is completed, the SU signal goes down and SU-DONE-INT goes up indicating that the sequencing up operation within a particular device has been completed. At the same time, signal EXTEND goes up so that the HOLDB can be extended until the falling edge of the EXTEND signal. By extending the HOLDB period, TPCLK remains to be pulled down, allowing other devices that start the sequencing up operations in the same TPCLK period to complete their sequencing up operations. When all such devices complete their sequencing up operations, the EXTEND signal goes low and so does the HOLDB signal. This causes the SU-DONE-EXT signal to go up, indicating to the external world that the sequencing up operations activated in this TPCLK period have all been completed.

After the sequencing up operations have been completed and before the On signal changes its state, there is a period for post sequencing monitoring. When the On signal goes down, it signals the starting point for sequencing down operations. Signal SD goes from a low state to a high state, signaling the starting point of the sequencing down operations. At the same time, HOLDB goes high to allow TPCLK to be pulled low. When the sequencing down operation of a device is completed, the SD signal goes low and SD-DONE-INT goes high, indicating that internal to that device, the sequencing down operation is completed. At that point, signal EXTEND goes high again to extend the high state of HOLDB so that TPCLK remains low. This provides an extended period to allow sequencing down operations of other devices (which activates the sequencing down operations in the same TPCLK period) to complete. When sequencing down operations are completed, signal SD-DONE-EXT goes up, which releases the high state of the EXTEND signal and the HOLDB signal.

Figure 4B:
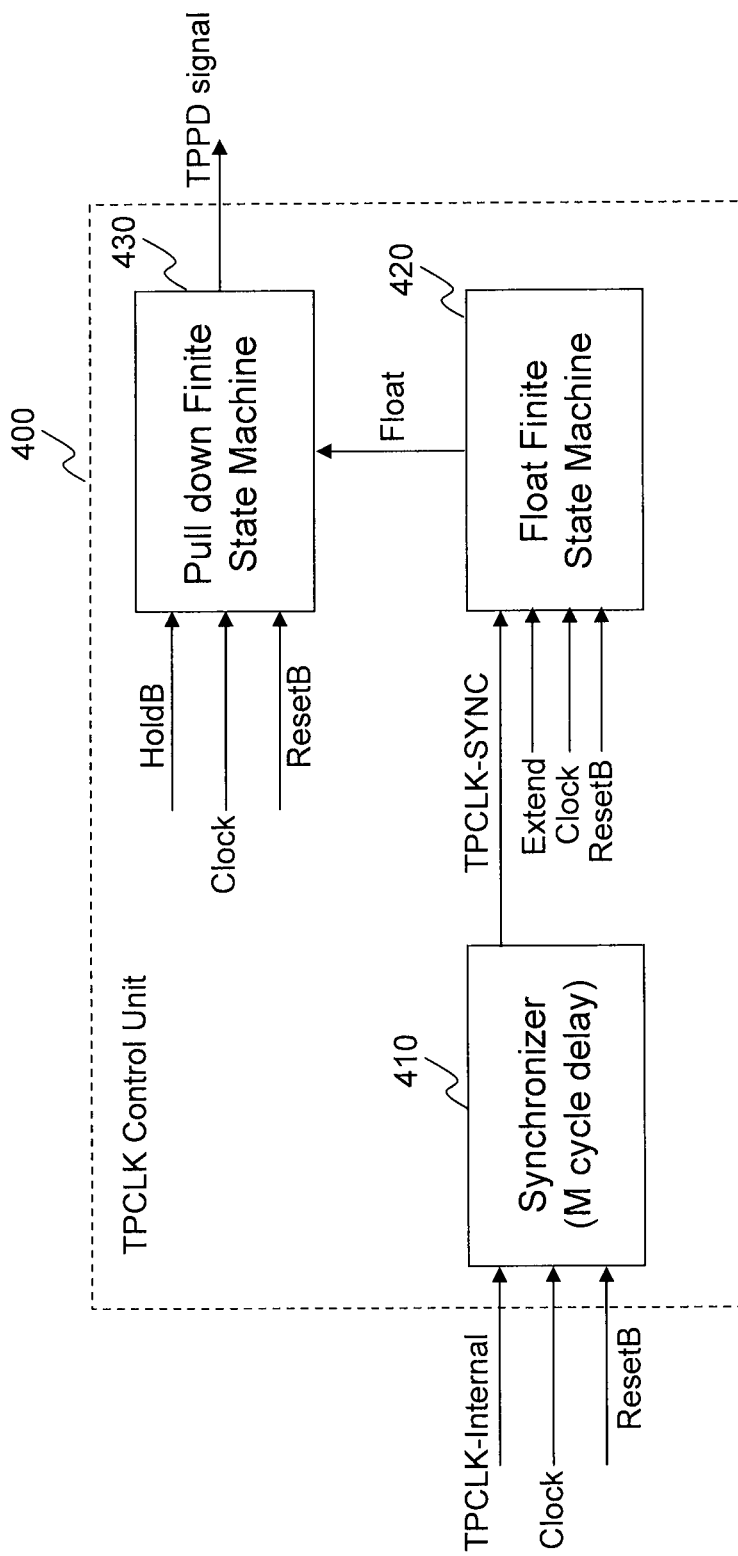

In FIG. 3, signal TPPD is generated based on the EXTEND and HOLDB signals based on a variety of ways. In some embodiments, the TPCLK control unit 310 may be implemented based on one or more clocked finite state machines. FIG. 4(b) depicts an exemplary implementation 400 of TPCLK control unit 310, according to an embodiment of the present teaching. In this exemplary embodiment, TPCLK control unit 400 comprises a synchronizer 410, a float finite state machine 420, and a pull down finite state machine 430. In the illustrated embodiment, the float finite state machine and pull down finite state machine are both clocked on the rising edge of the CLOCK signal. Other implementations are also possible.

The synchronizer 410 may be implemented based on registers. It receives the buffered TPCLK feedback signal as input (TPCLK-internal, which may be sampled with the CLOCK signal using, e.g., two D-type flip flops in succession. The output of synchronizer 410 corresponds to TPCLK-SYNC, which incurs a purposeful M clock cycle latency relative to the input of the synchronizer.

The two state machines operate or carry out state transitions based on different combinations of input signals given a prior state they are in. Denote different states as $A_n$, $B_n$, $C_n$, or $D_n$, where n=1 represents a state of the float finite state machine and n=2 represents a state of the pull down finite state machine. The pull down finite state machine 430 receives HOLDB, FLOAT, CLOCK and RESETB as inputs and produces TPPD signal as an output. In operation, whenever RESETB is low, the pull down finite state machine is set to state $A_2$. While in state $A_2$, the pull down finite state machine forces the TPPD signal high, causing switch 320 (see FIG. 3) to pull TPCLK low. When input HOLDB is also low, the pull down finite state machine 430 remains in the $A_2$ state. When both RESETB and HOLDB are high, pull down finite state machine 430 is clocked to state $B_2$ and output TPPD remains high. With both RESETB and HOLDB high, the pull down finite state machine 430 is clocked to state $C_2$ and output TPPD is pulled low, allowing current source 330 to pull TPCLK high. While in state $C_2$, the pull down finite state machine 430 waits for the output from the float finite state machine to pull high. When that happens, the pull down finite state machine 430 is clocked to state $D_2$ and waits for output of the float finite state machine 420 to become low. When the output of the float finite state machine 420 becomes low, the pull down finite state machine 430 returns to state $A_2$.

In operation, the float finite state machine 420 receives TPCLK-SYNC, EXTEND, CLOCK and RESETB as inputs and produces Float as an output (see FIG. 4). When input RESETB is low, the float finite state machine 420 is set to state $A_1$ and the Float output is set low. While in state $A_1$, if input TPCLK-SYNC is low, the float finite state machine 420 remains in state $A_1$. If input TPCLK-SYNC becomes high, the float finite state machine is clocked to $B_1$ and output Float is set high. The float finite state machine 420 remains in state $B_1$ if input EXTEND is high. If input EXTEND is low and input TPCLK-SYNC is high, the float finite state machine 420 is clocked to state $C_1$ and produces a high output Float. The float finite state machine 420 remains in state $C_1$ if input EXTEND is high. If input EXTEND is low and input TPCLK-SYNC is high, the float finite state machine 420 is clocked to state $D_1$ and produces a low Float output. The float finite state machine remains in state $D_1$ until input TPCLK-SYNC becomes low. When that happens, the float finite state machine 420 returns to state $A_1$.

Figure 5:
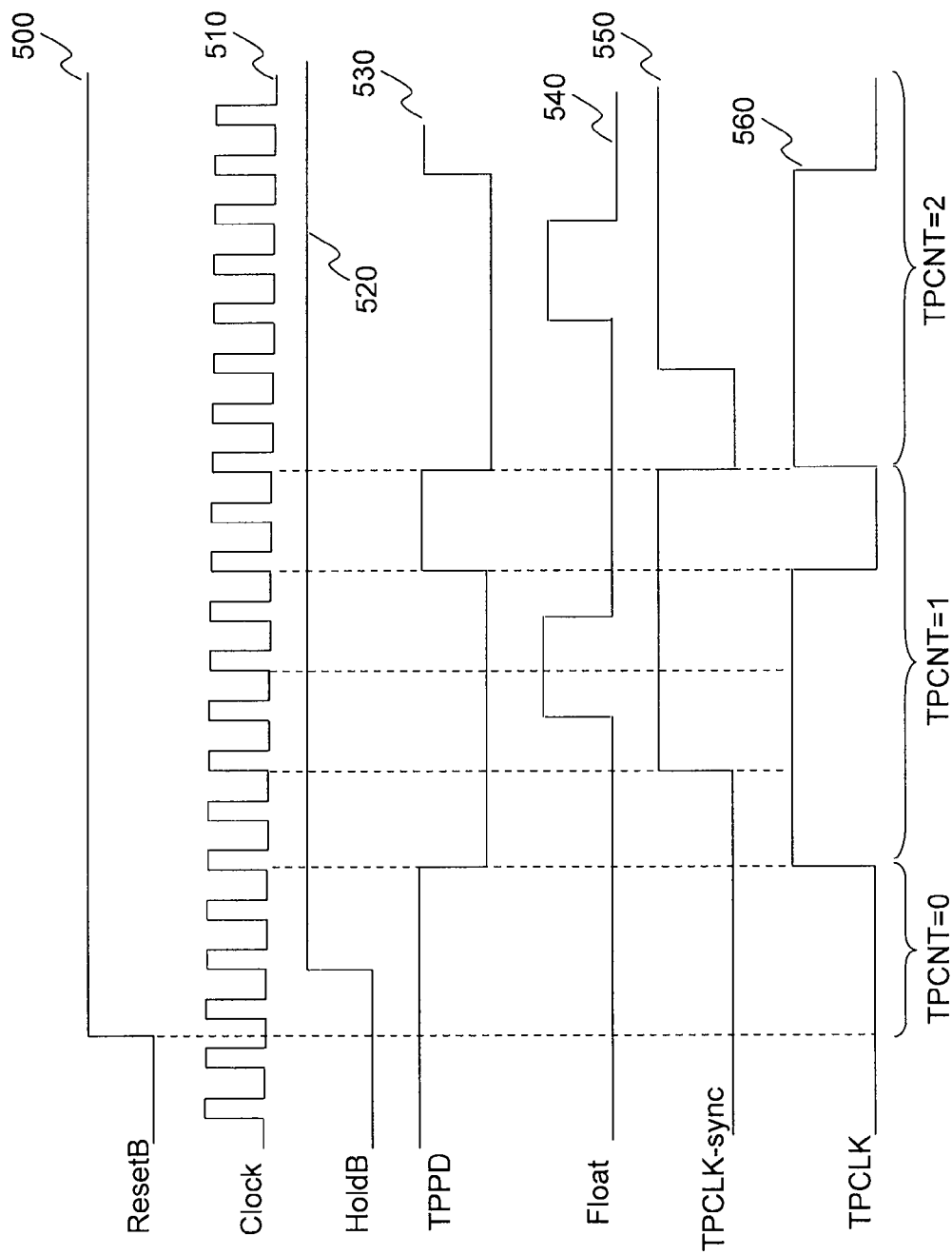
FIG. 5 illustrates a timing diagram of signals in a time position clock control unit, according to an embodiment of the present teaching.

FIG. 5 illustrates a timing diagram of different signals in a TPCLK control unit, according to an embodiment of the present teaching. As seen from FIG. 5, there are two oscillations of the TPCLK signal in this illustrated example. TPCLK starts to oscillate after the release of HOLDB (high state of HOLDB). In addition, each oscillation of TPCLK consists of a low period of two CLOCK cycles and a high period of six CLOCK cycles. In some situations, the number of cycles in which TPCLK remains in a same state may need to be extended. This can be achieved based on input signal EXTEND to a sequencing controller and will be discussed with reference to FIGS. 6 and 8.

It should be noted that when HOLDB becomes high (releasing the pull down state on TPCLK), other external devices may still be pulling down TPCLK (not shown here). Given that, since TPCLK is a single wire signal, sequencing operation cannot begin until all devices have released the pull down state on TPCLK. This feature is called self-organizing start up, which is important when multiple devices share TPCLK and one or more devices may not be allowed to sequence when there are unfinished initialization processes.

In some embodiments, a time position counter (TPCNT) may be used to keep track of sequencing positions. Such a counter can be implemented based on, e.g., a typical digital counter sensitive to the rising edges of TPCLK (TPCLK-internal). The incrementing value TPCNT of an exemplary TP counter is shown in FIG. 5. The value of TPCNT can be used also for synchronization purposes. For example, if some events are allowed to occur only at certain time positions, the value TPCNT can then be used to control the exact time positions for such events. As another example, sequence-up or sequence-down power supply enable/disable signals may be allowed to occur at time positions greater than zero. To control that, the TPCNT value can be compared against user-defined allowed time positions (e.g., greater than zero). If the time position count TPCNT is equal to the user-defined allowed time position value(s), event requests are allowed to occur at, e.g., the next high to low transition of TPCLK. In some embodiments, such user-defined allowed time positions may be stored in an electronic memory element and such configuration may be dynamically re-configured based on needs.

As discussed herein, TPCLK is pulled low in several different situations. First, when any particular TPCLK cycle starts, devices that still have scheduled events to be activated will all pull down TPCLK. For instance, as described herein, when a TPCLK high condition is sensed, all devices that still have pending events to be activated will pull down TPCLK for a specified minimum amount of time. In addition, when an event (e.g., power supply ramping up or ramping down) is activated, TPCLK is pulled low until the event is completed so that the corresponding event request can be terminated. The length of time TPCLK is pulled down may depend on the specific situation. For example, when the activated event is to enable a power supply, the power supply voltage during a ramping up process may be measured and such measured power supply voltage is compared against, e.g., a user defined threshold. As long as the measured power supply voltage is not yet reaching the threshold, TPCLK is pulled low. In this case, the event request (for power supply) will not be terminated, hence TPCLK remains pulled down until the measured power supply voltage reaches or exceeds the threshold.

Furthermore, if multiple devices have events activated in the same time position, TPCLK may be pulled down as long as any of such events is still not yet completed even when some of them may have completed. That is, in this case, TPCLK cannot advance to the next time position until all events across multiple devices in a given time position have met their termination criteria. Accordingly, TPCLK is pulled high (after remaining in a low state) only after the termination criteria are satisfied under different conditions.

Figure 6:
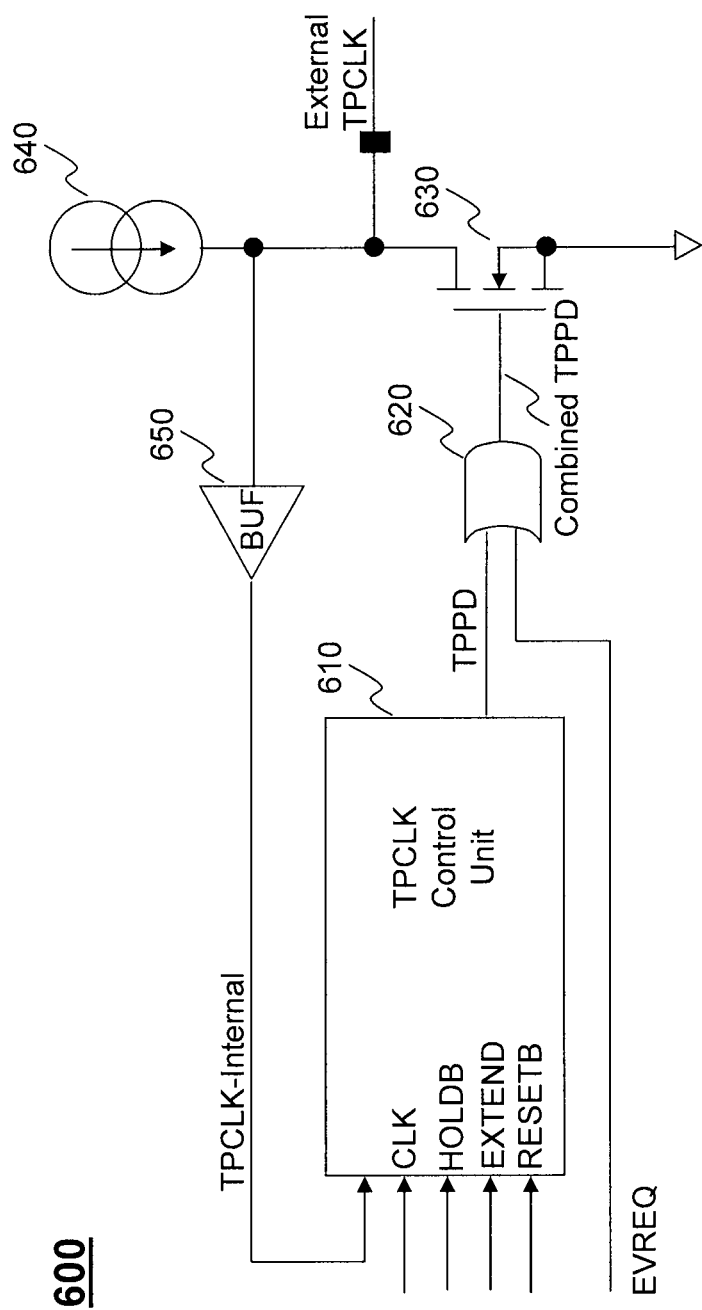
FIG. 6 depicts a different exemplary implementation of a sequencing controller, according to an embodiment of the present teaching.

To produce a TPCLK signal that can be pulled down appropriately under different conditions, an additional event request signal or EVREQ can be used in combination with other signals to generate TPCLK. FIG. 6 provides a different exemplary implementation of a sequencing controller 600 that incorporates the use of an event request signal to generate TPCLK, according to an embodiment of the present teaching. In FIG. 6, the sequencing controller 600 comprises essentially the same components as what is shown in FIG. 3 (e.g., a TPCLK control unit 610, a switch 630, a current source 640, and a buffer 650) except there is an additional OR circuit 620.

The logical "OR" circuit 620 is deployed for the purposes of stretching the TPCLK pull down time. The OR circuit 620 takes TPPD from the TPCLK control unit 610 (same as in FIG. 3) and an event request signal EVREQ as inputs and produces a combined time position pull down control signal as output to control the switch 630. Due to the functionality of OR, the combined TPPD signal will not be pulled low as long as either one of the inputs is high. That is, as long as the event request signal EVREQ is high, i.e., the event activated is not yet completed, the combined TPPD is high and TPCLK remains to be pulled down.

Figure 7:
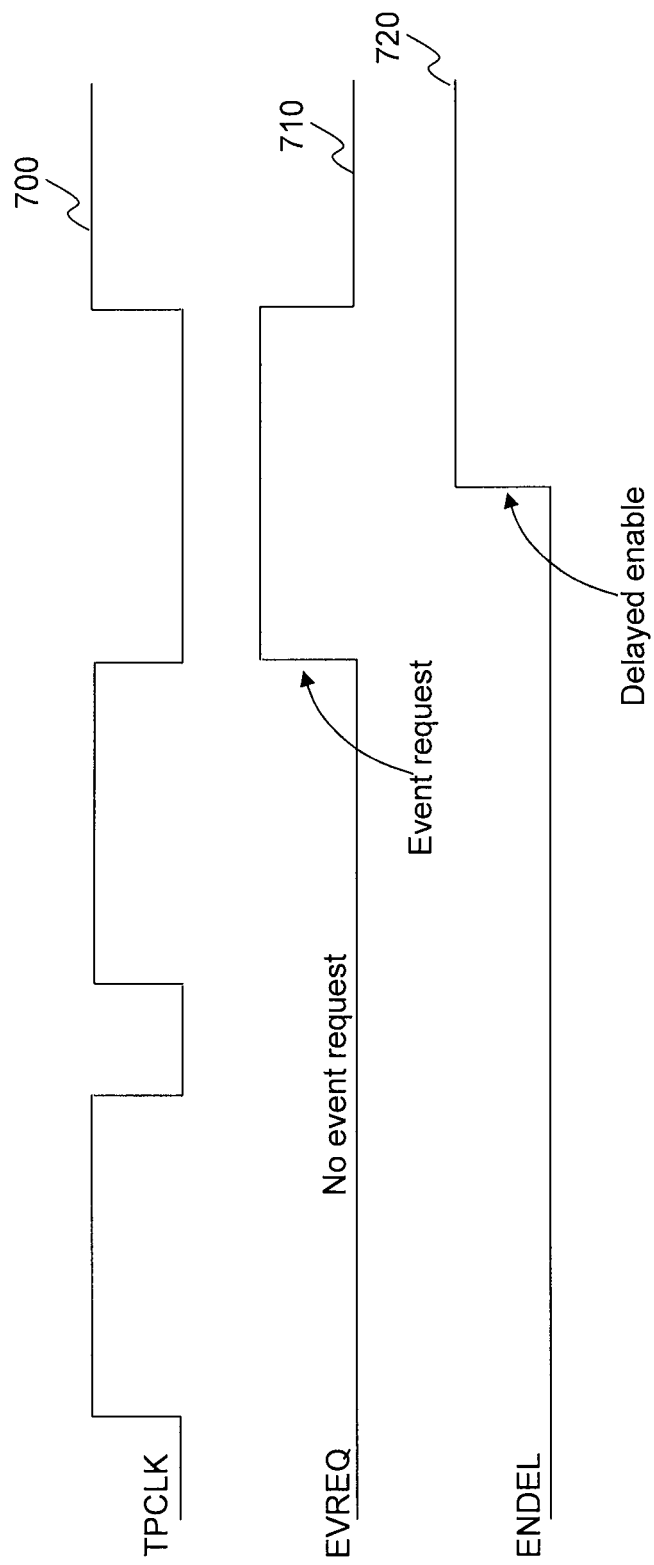
FIG. 7 shows the timing diagram of different signals, according to an embodiment of the present teaching.

FIG. 7 illustrates that TPCLK is stretched as a function of event request signal EVREQ. FIG. 7 also shows that the state of the event request signal or EVREQ remains high for a period of time which may cover different stages necessary for the event to complete. For example, it may cover a delay (e.g., $T_{ON\_}$ delay or $T_{Off\_}$ delay) in an enable signal, e.g., ENDEL as shown FIG. 7, which actually enables the event for the time needed for ramping up/down the event, and/or the time needed to complete any subsequent operations related to the event.

In some embodiments, more than one signal to be used to stretch the TPCLK pull down time can be combined through the "OR" operation. For example, when multiple events are sequenced in the same time position, event requests corresponding to those events may be also used as inputs to the OR circuit 620.

To facilitate self-termination in both single and multiple device systems, the following disclosure describes a scheme that allows inter-device communication in order for the overall system to detect when all events in all devices have been completed so that self-termination can be initiated. In a single device system, ascertaining when all events have been completed is quite trivial. However, in a multiple device system, to determine when all events from all devices have been completed, inter-device communications among devices has to be supported.

To facilitate such inter-device communications to enable self-termination across multiple devices in event synchronization, in some embodiments, a logical indication of each completed event request may be stored in a conventional electrical memory. When all events are complete, framing signals indicating the completion can be generated based on, e.g., a logical "AND" of the completed event data. Such framing signals may then be used to enable a timeout counter that is cleared whenever TPCLK-internal (see FIG. 3 and FIG. 6) is low. However, the EXTEND pulse is also initiated at this time and allows TPCLK to be pulled high.

In a single device system with EXTEND signal active, TPCLK will remain high until the timeout counter expires. The counter time can be set considerably longer than the typical TPCLK high time (e.g., the counter time can be set to approximately 32 CLOCK cycles). FIG. 8(*a*) shows the timing diagram involved in a one-device self-termination process, according to an embodiment of the present teaching. In this timing diagram, TPCLK 800, HOLDB 805, EXTEND 810, and both internal and external event-done signals (e.g., internal sequencing up/down signal, SU/SD-DONE-INT 815, and external sequencing up/down signal, SU/SD-DONE-EXT 820) are shown. As can be seen, HOLDB signal 805 is high during the event synchronization period and it extends also to cover the period in which signal EXTEND is high. EXTEND signal 810 goes high when the final event is completed. At the same time, the internal event-done signal (SU/SD-DONE-INT) goes high as well to mark the internal completion. At this time, since the external framing signal remains low, signal EXTEND goes high so that to extend the high state of HOLDB. The EXTEND signal does not become low until the framing signal 820 for external completion (SU/SD-DONE-EXT) becomes high, indicating that all events have been completed. At this time, EXTEND 810 and HOLDB 805 become low.

In a multiple device system, when one or more devices have completed event requests while others have not yet completed their events, TPCLK is periodically pulled low, clearing the timeout counters in devices that have completed their events. When the timeout counter in any one device expires, all devices must have completed their corresponding event requests. When this occurs, the framing signals 860 and 865 are pulled high, signaling that all connected devices have completed sequencing operations. At this time, both the EXTEND signals for the first and second devices can be terminated and HOLDB signal (which has been extended in a high state as long as either of the EXTEND signal is high) pulls low which causes TPCLK to be pulled low. TPCLK remains low until the next series of sequencing operations are initiated. FIG. 8(b) shows the timing diagram involved in a two-device self-termination process, according to an embodiment of the present teaching.

While the inventions have been described with reference to the certain illustrated embodiments, the words that have been used herein are words of description, rather than words of limitation. Changes may be made, within the purview of the appended claims, without departing from the scope and spirit of the invention in its aspects. Although the inventions have been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

We claim:

1. A system for event synchronization, comprising:
   one or more devices having a plurality of events to be carried out in a scheduled order in time and connected to a single shared time position clock (TPCLK);
   one or more sequencing controllers coupled with the one or more devices and configured to control the timing of high and low states of the shared TPCLK in accordance with the scheduled order, wherein
   synchronization among the plurality of events in the scheduled order is achieved based on the high and low states of the shared TPCLK,
   the synchronization of the plurality of events in the scheduled order is operated without the presence of master and slave devices.

2. The system of claim 1, wherein the one or more sequencing controllers are configured to enable the synchronization of events in a self-actuating manner.

3. The system of claim 1, wherein the one or more sequencing controllers are configured to enable the synchronization of events in a self-terminating manner.

4. The system of claim 1, wherein each of the one or more sequencing controllers controls the state of TPCLK in accordance with a plurality of parameters associated with one or more events to be synchronized.

5. The system of claim 1, wherein each sequencing controller comprises:
   a TPCLK control unit configured to generate a time position pull down (TPPD) signal;
   a switch having a first terminal coupled to the TPPD signal and configured to generate the TPCLK signal on a second terminal based on the TPPD signal;
   a pull up device coupled to the second terminal of the switch to facilitate the generation of the TPCLK that has a state corresponding to an inverted state of the TPPD signal;
   a buffer configured to buffer the TPCLK signal to provide a feedback TPCLK to the TPCLK control unit.

6. The system of claim 5, wherein the pull up device is a current source.

7. The system of claim 5, wherein the switch is implemented based on an NMOS device having its gate connected to the TPPD signal, its source connected to the ground, and drain connected to the TPCLK signal.

8. The system of claim 5, wherein the TPCLK control unit generates the TPPD signal based on a plurality of parameters relating to at least one event associated with one or more devices.

9. The system of claim 5, wherein the switch generates the TPCLK signal based also on one or more event request signals associated with corresponding one or more events to be synchronized via an underlying sequencing controller.

10. The system of claim 9, wherein the TPPD signal and the one or more event request signals are ORed to generate a combined TPPD signal and the TPCLK signal is generated based on an inverted state of the combined TPPD signal.

11. The system of claim 1, wherein the one or more sequencing controllers pulls the TPCLK low for a first period of time whenever the one or more devices is turned on or reset and then releases the TPCLK's low state to allow TPCLK to go high for a second period of time.

12. The system of claim 11, wherein a sequencing controller corresponding to a device that has an event to be synchronized in a subsequent TPCLK period pulls down TPCLK for a third pre-determined period of time and then releases the TPCLK.

13. The system of claim 12, wherein a sequencing controller that corresponds to a device having an event scheduled to be synchronized in a current TPCLK period pulls down TPCLK and releases TPCLK when the event to be synchronized is completed.

14. The system of claim 1, wherein when TPCLK remains in a high state for a fourth pre-determined period of time, it signals that all events to be synchronized across the one or more devices have been completed so that the synchronization process for the one or more events is self-terminated.

15. A method for event synchronization, comprising the steps of:
   accessing, by one or more sequencing controllers coupled with the one or more devices, information related to a plurality of events to be carried out in a scheduled order in time in connection with one or more devices, which are connected to a single shared time position clock (TPCLK);
   controlling, by one or more sequencing controllers, the timing of high and low states of the shared TPCLK in accordance with the scheduled order;
   synchronizing, by the one or more sequencing controllers, the plurality of events in the scheduled order based on the high and low states of the shared TPCLK, wherein
   the synchronization among the plurality of events in the scheduled order is operated without the presence of master and slave devices.

16. The method of claim 15, wherein the step of synchronization is performed in a self-actuating manner.

17. The method of claim 15, wherein the step of synchronization is performed in a self-terminating manner.

18. The method of claim 15, wherein the states of TPCLK are controlled in accordance with a plurality of parameters associated with one or more events to be synchronized.

19. The method of claim 15, wherein the states of TPCLK are controlled by:
   generating a time position pull down (TPPD) signal based on a plurality of inputs; and
   generating a state of the shared TPCLK based on the TPPD signal.

20. The method of claim 19, wherein the TPCLK is generated based on an inverted state of the TPPD signal.

21. The method of claim 19, wherein the plurality of inputs include:
   parameters relating to at least one event associated with one or more devices; and
   a feedback TPCLK signal.

22. The method of claim 21, wherein the plurality of inputs further include one or more event request signals associated with corresponding one or more events to be synchronized via an underlying sequencing controller.

23. The method of claim 22, wherein the TPPD signal and the one or more event request signals are ORed to generate a combined TPPD signal.

24. The method of claim 23, wherein the TPCLK signal is generated based on an inverted state of the combined TPPD signal.

25. The method of claim 15, wherein the step of controlling comprises:
pulling, by the one or more sequencing controllers, the TPCLK low for a first period of time whenever the one or more devices is turned on or reset and then releasing the TPCLK's low state to allow TPCLK to go high for a second period of time;
pulling down, by any sequencing controller corresponding to a device that has an event to be synchronized in a subsequent TPCLK period, TPCLK for a third pre-determined period of time and then releasing the low state of TPCLK;
pulling down, by any sequencing controller that corresponds to a device having an event scheduled to be synchronized in a current TPCLK period, TPCLK and releasing the low state of TPCLK when the event to be synchronized is completed.

26. The method of claim 15, wherein when TPCLK remains in a high state for a fourth pre-determined period of time, it signals that all events to be synchronized across the one or more devices have been completed so that the synchronization process for the one or more events is self-terminated.

27. A non-transitory machine readable medium having data stored thereon, the data, once read, cause the machine to perform the following:
accessing, by one or more sequencing controllers coupled with the one or more devices, information related to a plurality of events to be carried out in a scheduled order in time in connection with one or more devices, which are connected to a single shared time position clock (TPCLK);
controlling, by one or more sequencing controllers, the timing of high and low states of the shared TPCLK in accordance with the schedule order;
synchronizing, by the one or more sequencing controllers, the plurality of events in the scheduled order based on the high and low states of the shared TPCLK, wherein the synchronization among the plurality of events in the scheduled order is operated without the presence of master and slave devices.

28. The medium of claim 27, wherein the synchronization is performed in a self-actuating manner.

29. The medium of claim 27, wherein the synchronization is performed in a self-terminating manner.

30. The medium of claim 27, wherein the states of TPCLK are controlled in accordance with a plurality of parameters associated with one or more events to be synchronized.

31. The medium of claim 30, wherein the plurality of parameters include:
parameters relating to at least one event associated with one or more devices; and
a feedback TPCLK signal.

32. The medium of claim 31, wherein the plurality of inputs further include one or more event request signals associated with corresponding one or more events to be synchronized via an underlying sequencing controller.

33. The medium of claim 27, wherein the step of controlling comprises:
pulling, by the one or more sequencing controllers, the TPCLK low for a first period of time whenever the one or more devices is turned on or reset and then releasing the TPCLK's low state to allow TPCLK to go high for a second period of time;
pulling down, by any sequencing controller corresponding to a device that has an event to be synchronized in a subsequent TPCLK period, TPCLK for a third pre-determined period of time and then releasing the low state of TPCLK;
pulling down, by any sequencing controller that corresponds to a device having an event scheduled to be synchronized in a current TPCLK period, TPCLK and releasing the low state of TPCLK when the event to be synchronized is completed.

34. The medium of claim 27, wherein when TPCLK remains in a high state for a fourth pre-determined period of time, it signals that all events to be synchronized across the one or more devices have been completed so that the synchronization process for the one or more events is self-terminated.

* * * * *